July 5, 1949.                    D. R. BOONE                    2,475,174
                                  TRAILER
Filed March 28, 1947                                    2 Sheets-Sheet 1

INVENTOR
DANIEL R BOONE

ATTORNEY

July 5, 1949.   D. R. BOONE   2,475,174
TRAILER
Filed March 28, 1947   2 Sheets-Sheet 2
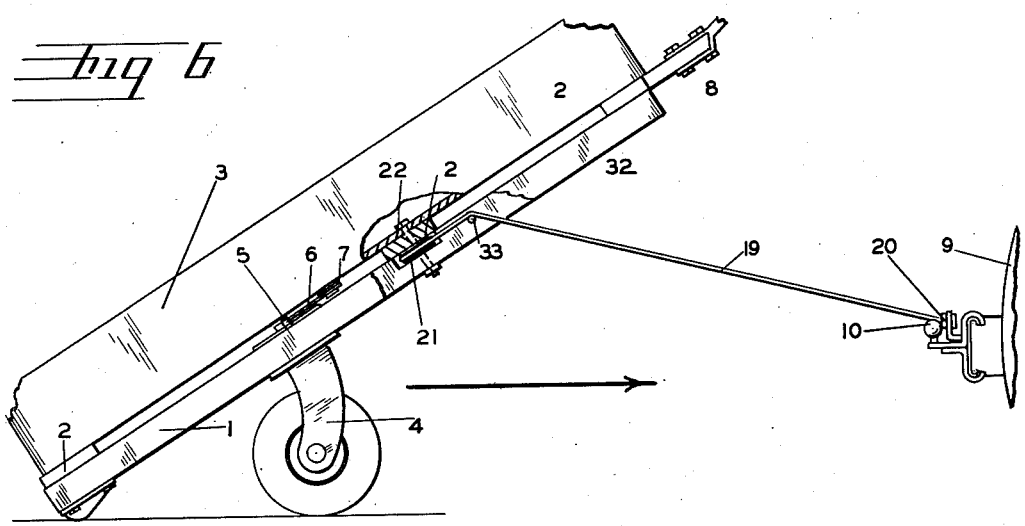
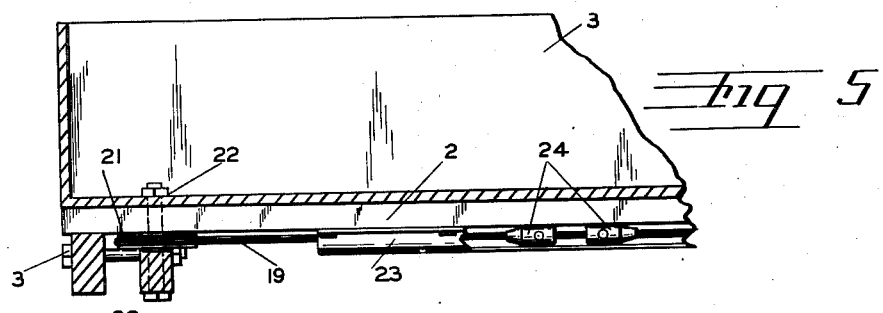
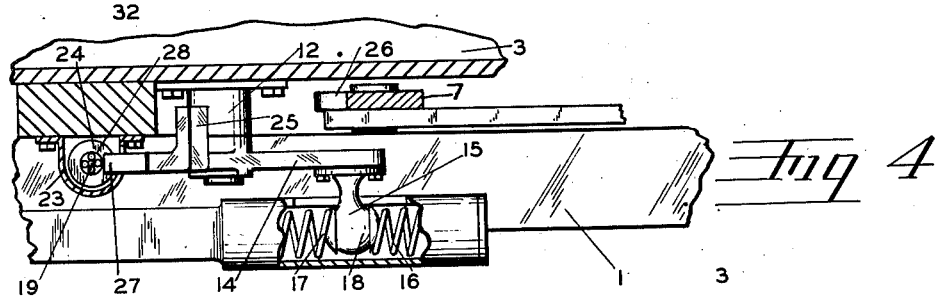
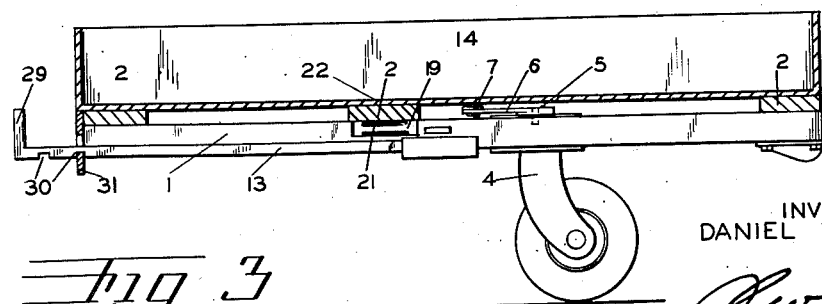
INVENTOR
DANIEL R. BOONE
ATTORNEY Patented July 5, 1949

2,475,174

UNITED STATES PATENT OFFICE 2,475,174

TRAILER

Daniel R. Boone, Portland, Oreg.

Application March 28, 1947, Serial No. 737,798

9 Claims. (Cl. 280—33.4)

This invention relates to trailers and particularly to those trailers employing a pair of caster wheels and having the single trailer hitch connected to the tractor vehicle.

The primary object of the invention is to provide a rigid connection between the tractor vehicle and the trailer while backing the trailer up, at the same time unlocking the caster wheels so that they may operate about their vertical pivot, permitting the trailer to be swung with the tractor vehicle while parking and so forth.

A further object of the invention is providing means of locking said caster wheels about their vertical axis and releasing the rigid connection between the tractor vehicle and the trailer so that the trailer may track behind the vehicle in the usual manner.

A still further object of the invention is the provision of means within the trailer assembly for allowing the front of the trailer to be raised up for dumping purposes, but at the same time the control cable connections are maintained so that when the tractor vehicle is moved forward it will pull the trailer away from the load having been dumped permitting the draw bar to be reconnected after the load has been dumped.

These and other incidental objects will be apparent in the drawings, specification and claims.

Referring to the drawings:

Figure 3 is a longitudinal sectional view of the trailer taken on line 3—3 of Figure 1.

Figure 4 is an enlarged fragmentary sectional view taken on line 4—4 of Figure 2.

Figure 5 is a fragmentary sectional view taken on line 5—5 of Figure 2.

Figure 6 illustrates the trailer hitch having been released and the trailer in dumping position, the control cables maintaining the same in connection with the tractor vehicle.

In the drawings:

Figure 1:
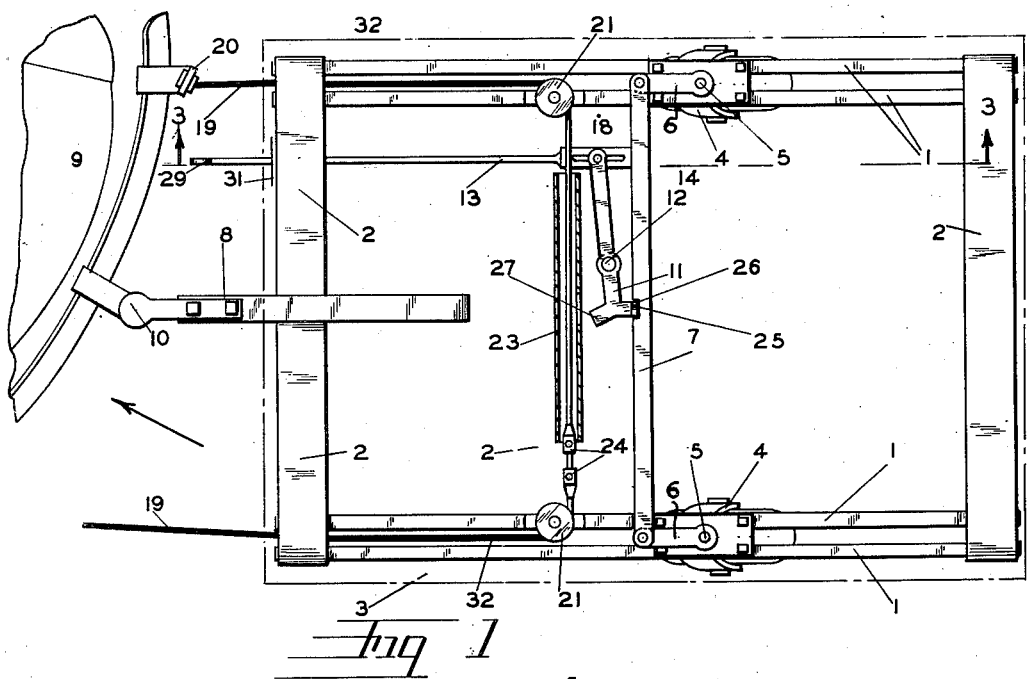
Figure 1 illustrates my new and improved trailer having the body of the same removed and illustrating the control parts, said controls being in a position for forward travelling of the tractor vehicle and the trailer.

My new and improved trailer consists of a framework consisting of double side rails 1 and cross members 2. In the drawings I have omitted showing the body of the trailer, but have indicated by broken lines 3 its relative position, the purpose of which was to clarify the operation of the control parts.

The trailer is mounted upon a pair of caster wheel assemblies 4, which are pivotally mounted to the side frames 1 by the vertical king pins 5 extending upwardly from the caster wheel assembly. Lever arms 6 are keyed to the king pins 5 and are connected together by the connecting link 7. This maintains the direction of travel of each of the caster wheels in a parallel relationship.

The forward end of the trailer has the usual draw bar 8 connected to the tractor vehicle 9 by the usual trailer hitch 10. I will first describe the operation of the trailer behind the tractor vehicle 9 as it would be travelling on the highway.

The cross link 7 would be held in the position shown in Figure 1 by the double locking latch 11, which is pivotally mounted at 12 to the bottom of the body 3 of the trailer, best illustrated in Figure 4. An operating control rod 13 is flexibly connected to the ball 15 of the end 14 of the latch 11, said ball floating between the springs 16 and 17 within the sockets 18. When the control rod 13 is in the position illustrated in Figure 1 it will cause the latch 11 to lock the cross link 7 from movement holding the caster wheels in the position shown.

I will now describe the operation of the control cable 19 which has its ends fixedly secured to the tractor vehicle at 20. This cable is trained about pulleys 21, said pulleys being fixedly mounted to the side frames 1 at 22, the cable passing through a housing or tunnel 23 which is fixedly secured to the cross member 2 of the trailer, best illustrated in Figures 1, 2, 3 and 5.

Figure 2:
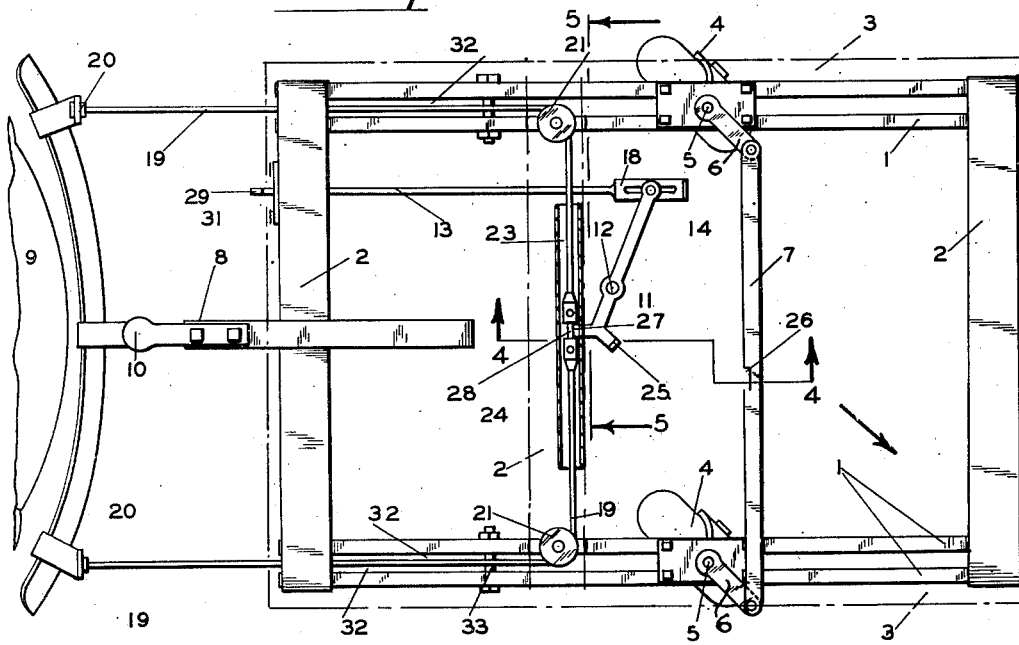
Figure 2 is the same as Figure 1 except the control parts are shown in a position for releasing the trailer wheels about their vertical axis and with a rigid connection between the tractor vehicle and the trailer for backing the same up.

Fixedly secured midway of the ends of the cable are holding members 24. Referring to Figure 2 it will be noted that the control lever has been shifted disengaging the dog 25 out of engagement with the notch 26 of the cross link 7 and brought into engagement with the space 28 between the holding members 24, thereby releasing the caster wheels allowing them to pivot about their vertical axis and at the same time locking the cable 19 from movement by the dog 27 engaging the space 28 between the holding members 24. This causes a rigid lateral connection between the tractor vehicle 9 and the trailer. The object is that in backing up the trailer when this connection is made rigid and the caster wheels permitted to rotate about their vertical axis the tractor vehicle can swing and definitely control the position of the trailer behind said vehicle so that the trailer and the tractor vehicle can be backed into parking places and the like. This is one of the primary features of my invention.

When the control lever 13 is shifted by its handle 29 by releasing the same from the notches 30 relative to the stop 31, the dogs 25 and 27 may not be in alignment with the notch 26 of the cross link 7 or the space 28 between the holding members 24 on the cable 19, therefore the springs 16 and 17 located on either side of the ball 15 will provide sufficient resiliency to snap the dogs 25 and 27 into said notches and space when alignment takes place. When forward movement takes place the casters will rotate about their vertical axis to the position shown in Figure 1.

Referring to Figure 6, I illustrate my trailer in dumping position. This is made possible due to the fact that the cable 19 normally is guided through the channel 32 formed by the side frames 1 and over the cross members 33, therefore when the trailer hitch assembly 10 is disconnected these cables will be held in alignment with the pulleys 21 by these cross members, but permitted to drop down out from the channel 32 as illustrated, still maintaining its proper relation to the locking assembly. The tractor vehicle may move forward in this position pulling the trailer away from the dumped load after which the same may be brought down where the trailer hitch is again connected and will have been maintained in the proper alignment by the cables 19 so that little effort is expended in making the reconnection.

I do not wish to be limited to the exact mechanical structure as shown, as other modified mechanical equivalents may be substituted still coming within the scope of my claims.

I claim:

1. A trailer for hitching onto a tractor vehicle and which comprises a frame mounted on wheels, a draw bar secured to said frame and having means for hitching to a tractor vehicle, a cable movably looped transversely of said frame and forwardly along its sides and having its ends attachable to either side of the tractor vehicle, whereby to align said trailer with the tractor vehicle, and means mounted on said trailer for holding said cable against movement to maintain said trailer aligned with the tractor vehicle.

2. A trailer for hitching onto a tractor vehicle and which comprises a frame mounted on wheels, a draw bar secured to said frame and having means for hitching to a tractor vehicle, a cable movably looped transversely of said frame and forwardly along its sides and having its ends attachable to either side of the tractor vehicle whereby to align said trailer with the tractor vehicle, a latch member on said cable, and a locking member movably mounted on said trailer and having a latch member to cooperate with the latch member on said cable for holding said cable against movement to maintain said trailer aligned with the tractor vehicle.

3. A trailer for hitching onto a tractor vehicle and which comprises a frame mounted on wheels, a draw bar secured to said frame and having means for hitching to a tractor vehicle, a cable movably looped transversely of said frame and forwardly along its sides and having its ends attachable to either side of the tractor vehicle whereby to align said trailer with the tractor vehicle, a latch member on said cable, a locking member movably mounted on said trailer and having a latch member to cooperate with the latch member on said cable for holding said cable against movement to maintain said trailer aligned with the tractor vehicle, and a control member resiliently connected with said locking member for resiliently moving said locking member to and from latching position relative to said cable.

4. A trailer for hitching onto a tractor vehicle and which comprises a frame mounted on wheels, a draw bar secured to said frame and having means for hitching to a tractor vehicle, a cable movably looped transversely of said frame and forwardly along its sides and having its ends attachable to either side of the tractor vehicle whereby to align said trailer with the tractor vehicle, a latch member on said cable and having a notch therein, and an arm pivotally mounted on said trailer and having a dog for mating with said notch in said latch member on said cable for holding said cable against movement to maintain said trailer aligned with the tractor vehicle.

5. A trailer for hitching onto a tractor vehicle and which comprises a frame mounted on wheels, a draw bar secured to said frame and having means for hitching to a tractor vehicle, a cable movably looped transversely of said frame and forwardly along its sides and having its ends attachable to either side of the tractor vehicle whereby to align said trailer with the tractor vehicle, a latch member on said cable and having a notch therein, an arm pivotally mounted on said trailer and having a dog for mating with said notch in said latch member on said cable for holding said cable against movement to maintain said trailer aligned with the tractor vehicle, and a control lever having a resilient connection with said arm for resiliently pivoting said arm to swing said dog to and from mating position with the notch in said cable latch member.

6. A trailer for hitching onto a tractor vehicle and which comprises a frame, a hitch for connecting said trailer to a tractor vehicle, caster wheels pivotally mounted to said frame on normally vertical axes to permit a swivel movement of said wheels for facilitating angular movement of said trailer, a linkage connecting said wheels to maintain them in parallel relationship, a cable movably looped transversely of said frame and forwardly along its sides and having its ends attachable to either side of the tractor vehicle whereby to align said trailer with the tractor vehicle, and means mounted on said trailer for holding said linkage rigidly to prevent swiveling of said wheels and also for holding said cable against movement to maintain said trailer aligned with the tractor vehicle.

7. A trailer for hitching onto a tractor vehicle and which comprises a frame, a hitch for connecting said trailer to a tractor vehicle, caster wheels pivotally mounted to said frame on normally vertical axes to permit a swivel movement of said wheels for facilitating angular movement of said trailer, a linkage connecting said wheels to maintain them in parallel relationship, a cable movably looped transversely of said frame and forwardly along its sides and having its ends attachable to either side of the tractor vehicle whereby to align said trailer with the tractor vehicle, and means mounted on said trailer for selectively holding said linkage rigidly to prevent swiveling of said wheels or for holding said cable against movement to maintain said trailer aligned with the tractor vehicle.

8. A trailer for hitching onto a tractor vehicle and which comprises a frame, a hitch for connecting said trailer to a tractor vehicle, caster wheels pivotally mounted to said frame on normally vertical axes to permit a swivel movement of said wheels for facilitating angular movement of said trailer, a linkage connecting said wheels to maintain them in parallel relationship, a cable movably looped transversely of said frame and forwardly along its sides and having its ends attachable to either side of the tractor vehicle whereby to align said trailer with the tractor vehicle, a latch member on one of the links of said linkage, a latch member secured on said cable, a locking member having latch members to cooperate with the latch members on said linkage and said cable, said locking member being movably mounted to lockingly engage its latch members with said linkage and cable latch member respectively, and a control member resiliently connected with said locking member for resiliently moving said locking member to and from latching position relative to said linkage and said cable respectively.

9. A trailer comprising a frame, supporting caster wheels pivotally mounted to said frame on their vertical axis, said caster wheels being aligned together by a connecting link, a draw bar fixedly secured to said trailer frame and adapted to be connected to a tractor vehicle, an aligning cable fixedly connected to the tractor vehicle on either of its ends, said cable running longitudinally of the trailer frame to pulleys located on either side of the trailer, holding members fixedly mounted at the midsection of the cable running transversely of the trailer frame, a locking latch pivotally mounted between said holding members and the above said cross link, said locking latch having a dog for engaging a notch in said cross link, a second dog affixed to said latching arm for engaging a space between said holding members on said cable, a control rod adapted to move the locking latch so as to select either the said link or said cable.

DANIEL R. BOONE.

REFERENCES CITED

The following references are of record in the file of this patent:

UNITED STATES PATENTS

| Number | Name | Date |
| --- | --- | --- |
| 767,911 | McCabe | Aug. 16, 1904 |
| 1,201,800 | Byron | Oct. 17, 1916 |
| 1,336,735 | Doe | Apr. 13, 1920 |
| 1,460,564 | Ashley | July 3, 1923 |
| 1,538,054 | Ohnstrand | May 19, 1925 |
| 2,345,945 | Miner | Apr. 4, 1944 |